United States Patent [19]

Steger et al.

[11] 4,429,794

[45] Feb. 7, 1984

[54] UNITIZED PACKAGING ARRANGEMENT

[76] Inventors: Jay D. Steger, 1413 Bayside La., Wheeling, Ill. 60090; Thomas G. Neitzke, 210 E. Evergreen, Mt. Prospect, Ill. 60056; Stephen J. Gagnon, 4128 B. Cove La., Glenview, Ill. 60025

[21] Appl. No.: 374,104

[22] Filed: May 3, 1982

[51] Int. Cl.³ .................. B65D 19/04; B65D 19/20
[52] U.S. Cl. ................................. 206/597; 108/51.3; 108/56.1; 206/600
[58] Field of Search .............................. 206/595-600, 206/386, 322, 516; 108/51.1, 51.3

[56] References Cited

U.S. PATENT DOCUMENTS

| | | | |
|---|---|---|---|
| 2,489,054 | 11/1949 | Sprolle | 206/386 |
| 2,566,385 | 9/1951 | Van Patten | 206/597 |
| 2,833,403 | 5/1958 | Benschoter | 206/599 X |
| 2,894,671 | 7/1959 | Nicholls | 206/600 X |
| 3,043,450 | 7/1962 | Caprin et al. | 206/600 |
| 3,085,698 | 4/1963 | Moldovan | 206/598 X |
| 3,242,884 | 3/1966 | Best et al. | 206/600 X |
| 3,357,553 | 12/1967 | Dick et al. | 206/597 |
| 3,389,813 | 6/1968 | Kat et al. | 206/598 |
| 3,884,935 | 5/1975 | Burns | 206/597 X |
| 3,964,618 | 6/1976 | Dreyer | 206/600 |

Primary Examiner—William T. Dixson, Jr.
Assistant Examiner—Bryon Gehman
Attorney, Agent, or Firm—Dressler, Goldsmith, Shore, Sutker & Milnamow, Ltd.

[57] ABSTRACT

An improved packaging arrangement and method are disclosed which facilitate formation of a unitized shipping load. The arrangement includes an inexpensively fabricated tray-like support member which may be fitted about lower portions of the shipping load. A protective top cover may be provided for the shipping load as well, and tensioned shipping strapping positioned about the multiple tiers of the shipping load to enhance its unitization. The resultant shipping load may be readily transported by vehicle-mounted lift tines, with the arrangement of the disposable packaging members affording desired protection for the contents of the load, and obviating problems associated with typical reusable shipping pallets and the like.

19 Claims, 9 Drawing Figures

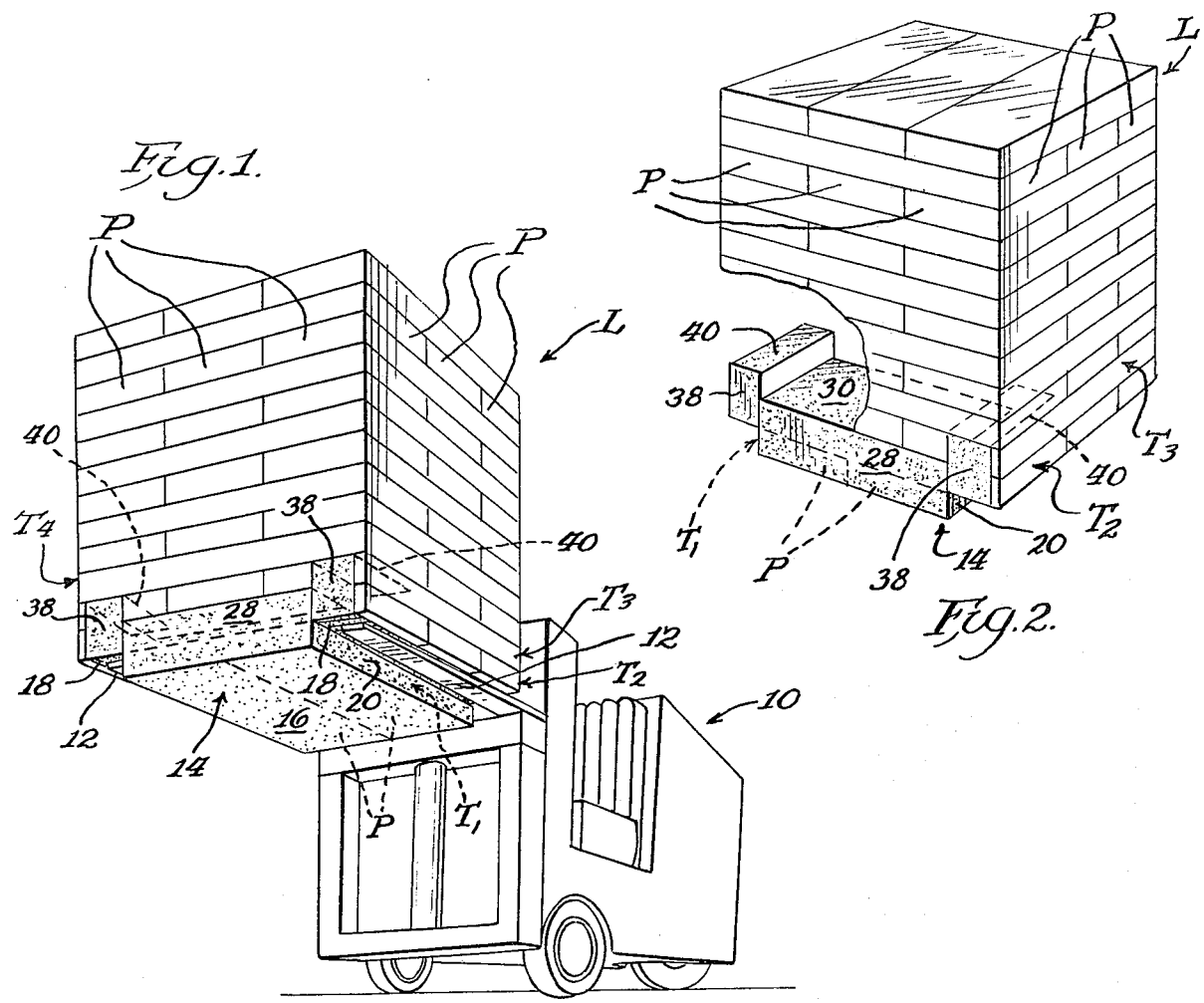
Fig.1.
Fig.2.
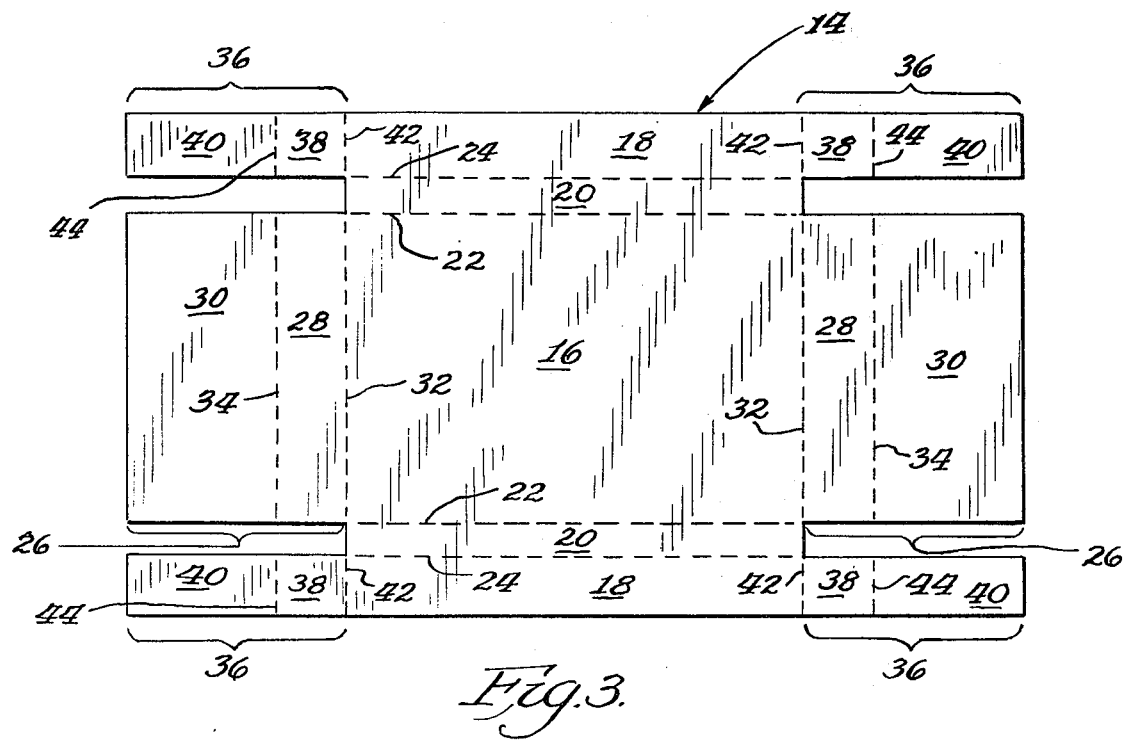
Fig.3.

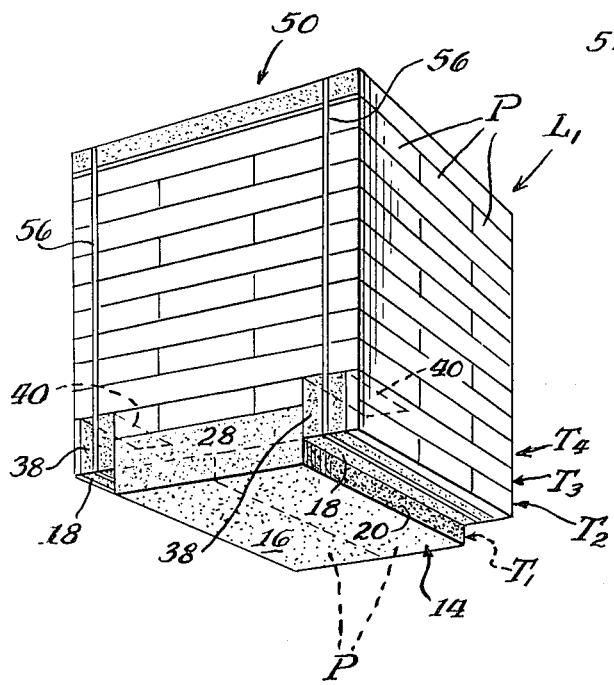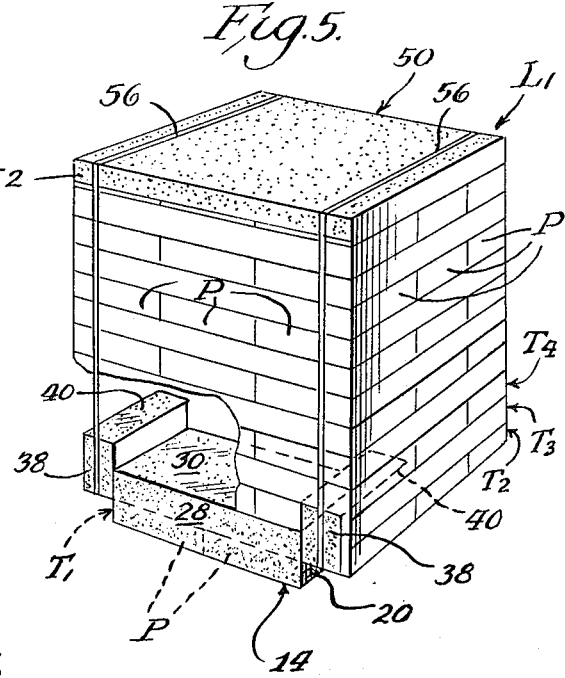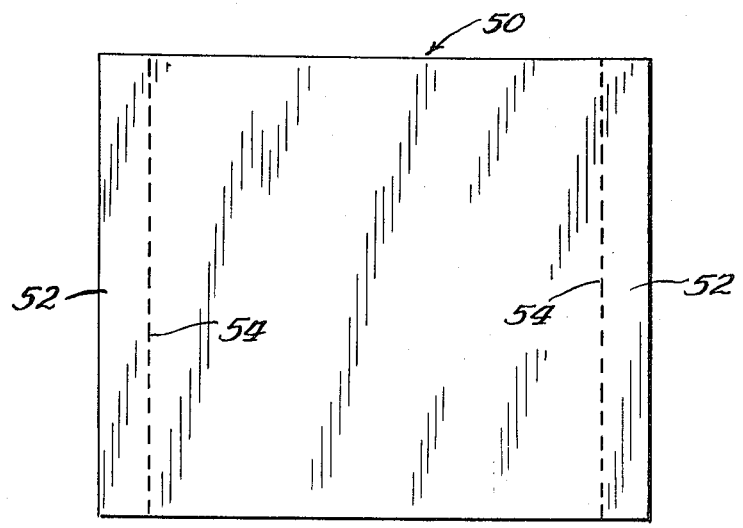

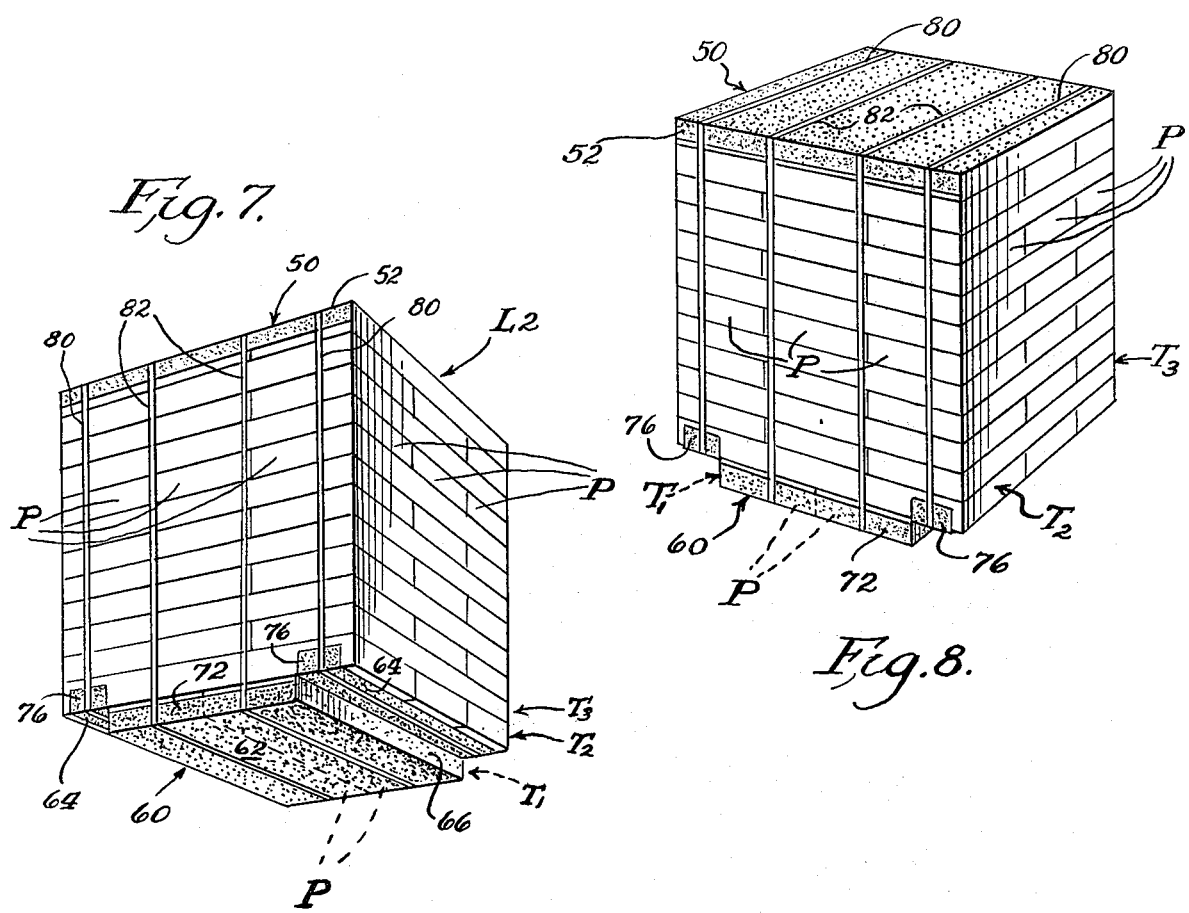
Fig. 7.
Fig. 8.
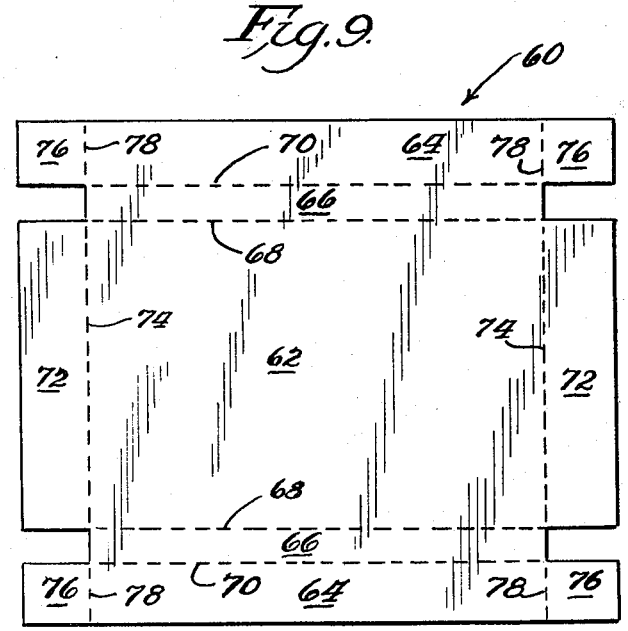
Fig. 9.

UNITIZED PACKAGING ARRANGEMENT

TECHNICAL FIELD

The present invention relates generally to arrangements which facilitate transport of shipping loads, and more particularly to an improved arrangement for packaging and unitizing a multi-tiered array of packages which facilitates transport of the unitized shipping load formed thereby by vehicle-mounted lift tines or the like.

BACKGROUND OF THE INVENTION

The use of wooden pallets for forming palletized shipping loads has been widespread for a number of years. Forming loads in this fashion facilitates their transport by a forklift or like vehicle including lift tines mounted thereon, since the lift tines may be inserted within the wooden pallet for lifting and relocation of the shipping load. However, the use of wooden shipping pallets is not without some drawbacks. Not only are the pallets themselves relatively heavy, their requisite strength essentially precludes that they be disposable in nature. As a consequence, the use of wooden pallets requires that suitable accounting and return shipment procedures be provided, thus detracting from economical use of returnable pallets of this nature.

Another problem which may be encountered with the use of wooden shipping pallets may occur when the pallets are used for shipment of goods which are non-rigid in nature. In this regard, the non-uniform upper surface of the wooden pallets may mar or otherwise damage the lowermost portions of the load of products where the products do not present hard, rigid surfaces. For example, this type of problem is frequently encountered in shipment of palletized loads of roofing shingles, with the non-rigid nature of the packages of shingles frequently resulting in damage to portions of the load which engage the wooden pallet. Naturally, it is desirable that all portions of the load to be shipped remain undamaged for delivery, since any damage to the load results in waste and customer dissatisfaction.

Commonly assigned U.S. Pat. No. 3,298,326 illustrates a load-retaining sling which may be used for forming loads to be handled by a forklift. While this type of arrangement has proved beneficial in overcoming some of the disadvantages associated with the use of wooden shipping pallets, the sling arrangement of this patent contemplates the use of adhesive for holding the sling in place, somewhat detracting from its convenient use.

In view of the above drawbacks associated with the use of returnable wooden pallets and other load-forming arrangements, it is desirable to provide a packaging arrangement for unitizing a load of packages which may be conveniently used and economically disposed of after a single shipment, and which avoids undesired damage to portions of the load which may result from unitization, handling, and shipment.

SUMMARY OF THE INVENTION

In accordance with the present invention, an improved arrangement for forming a unitized, palletless shipping load of packages is provided which is not only economical but also acts to protect the load from damage during handling and shipment. The novel unitized shipping load formed precludes the use of conventional wooden pallets, yet handling of the load with vehicle-mounted lift tines, such as those of a forklift or similar device, is facilitated.

The unitizing arrangement of the present invention includes a unitary, preferably one-piece support member which acts as a tray for the formation of the shipping load thereon without the use of adhesives. The support member may be economically formed from a single piece of fiberboard or like material, and facilitates arrangement of the shipping load thereon by formation of multiple tiers of packages arranged in a layered array. Preferably, the tiers of packages are arranged such that the second tier of packages includes portions which overhang laterally opposite sides of at least a portion of a first, lowermost tier of packages, so that together the first and second tiers of packages define a pair of laterally spaced openings which are adapted to receive lift tines from a forklift or the like. Additional tiers of packages are typically assembled atop the first and second tiers, the total number of tiers in the shipping load formed depending upon the size of the packages in the load and the desired size of the unitized load ultimately formed.

The unitary support member or tray of the present invention includes a base portion adapted to fit in aligned relation beneath the first tier of packages of the load. The support member further includes a pair of tine-engaging portions which are respectively connected to laterally opposite edges of the base portion. The support member is positioned so that the tine-engaging portions are adapted to fit beneath and underly the overhanging portions of the second tier of packages of the load. In this way, the tine-engaging portions present downwardly facing surfaces which are adapted to engage lift tines for transport of the load, with the arrangement of the support member protecting the packages of the load from damage from the lift tines.

In order to further protect the lower portions of the load, the unitary support member of the present invention includes pairs of protective end flap portions which overlap longitudinally opposite sides of the load. First protective end flap portions are provided connected to the base portion of the support member, and are adapted to extend upwardly of the base portion for shielding and protecting the packages of the load. Second protective end flap portions are also provided connected to the tine-engaging portions of the support member. Each second end flap portion is adapted to be folded upwardly to further protect and shield the packages of the load from damage. This arrangement significantly improves upon previously used load-handling strips and the like which merely fit underneath a shipping load of packages and do not include any type of end flap portions for protection of the exposed side surfaces of the load.

In order to enhance the unitizing nature of the support member of the present invention, each of the protective end flap portions of the member may be provided with a tuck portion which extends inwardly of the load between adjacent tiers thereof. It will be appreciated that providing the protective end flap portions with portions tucked into and retained by the shipping load enhances the cooperation of the tiers of the load with the support member, thereby acting to retain the load in its desired configuration and hold the support member in position for protection of the lowermost portions of the load. These tuck portions of the support member may be readily folded over and interleaved with the tiers of the load during positioning of the packages of the load for its formation.

The unitizing arrangement of the present invention may further include a plurality of shipping straps which tightly encircle and encompass the load to enhance its unitization. The shipping straps are preferably arranged to cooperate with the tray-like support member so that the straps do not directly engage the packages of lower portions of the load, which might otherwise cause deformation or other damage to these portions of the load.

When the unitized load of the present invention includes shipping straps as described above, the load may be provided with a protective top cover member positioned atop the uppermost tier of the load. The top cover member may be positioned on the load before the shipping straps are applied thereto, and thus the top portions of the load are protected from deformation by the shipping straps. Additionally, the top cover member protects the uppermost surface of the load from damage which might otherwise occur during shipment, stacking of loads, or other handling.

Other advantages and features of the present invention will become readily apparent from the following description thereof, from the claims and from the accompanying drawings in which like numerals are employed to designate like parts throughout the same.

DESCRIPTION OF THE DRAWINGS

FIG. 1 is a perspective view of a unitized shipping load formed in accordance with the present invention during handling by vehicle-mounted lift tines;

FIG. 2 is an elevated, partially cutaway perspective view of the unitized shipping load illustrated in FIG. 1;

FIG. 3 is a top plan view of a unitary support member used in forming the unitized shipping load of FIG. 1;

FIG. 4 is a perspective view of a unitized shipping load formed in accordance with a further embodiment of the present invention;

FIG. 5 is an elevated, partially cutaway perspective view of the unitized shipping load illustrated in FIG. 4;

FIG. 6 is a plan view of a top cover member used in the formation of the unitized shipping load illustrated in FIG. 4;

FIG. 7 is a perspective view of a unitized shipping load formed in accordance with a further embodiment of the present invention;

FIG. 8 is an elevated perspective view of the unitized shipping load illustrated in FIG. 7; and FIG. 9 is a plan view of a unitary support member used for formation of the unitized shipping load illustrated in FIG. 7.

DETAILED DESCRIPTION

While the present invention is susceptible to embodiment in different forms, there are disclosed in the drawings and described herein various embodiments of the invention, with the understanding that the present disclosure is to be considered as an exemplification of the invention and is not intended to be limited to the specific embodiments illustrated.

With reference now to FIGS. 1 and 2, therein is illustrated a unitized shipping load L which is adapted for transport by forklift 10 having lift tines 12, or other suitable vehicle-mounted lift tines. It will be appreciated that shipping load L is intended as illustrative, and may actually have a wide variety of configurations and sizes without departing from the principles of the present invention.

Shipping load L includes a plurality of tiers of one or more packages P arranged in a layered array (shown partially cutaway in FIG. 2 for clarity), with the alternating directions of the packages of successive tiers of the shipping load being preferred. For ease in describing the present invention, shipping load L, as well as other unitized shipping loads described hereinafter, will be described as including a first, lowermost tier of packages (shown in phantom line) designated $T_1$, with successively arranged tiers thereupon designated $T_2$, $T_3$, and $T_4$. It will be appreciated that the exact number of tiers of packages in the shipping load depends upon the nature and size of the packages, as well as the desired size of the load to be ultimately formed.

In order to facilitate handling of load L by lift tines 12, a pair of laterally spaced apart openings are defined by tiers $T_1$ and $T_2$ in that portions of tier $T_2$ overhang laterally opposite sides of tier $T_1$. In this way, the tine-receiving openings of the load flank at least a portion of the first tier of packages of the load so that the entire load L may be readily lifted and transported by fork lift 10 or the like. It will be noted, that the load unitizing arrangement of the present invention may be readily adapted for formation of shipping loads having spaced, tine-receiving openings configured other than the exact configurations depicted in the drawings.

As further illustrated in FIG. 3, the unitized packaging arrangement of the present invention includes a unitary support tray or member 14 which generally defines the lowermost surfaces of load L. Support member 14 is preferably fabricated from material which is sufficiently inexpensive to permit disposable use of the support member but which still provides the desired protection of the packages of the load. Support member 14 may be suitably fabricated from 75 point solid fiberboard, although a variety of other materials could also be used.

Support member 14 is preferably fabricated from a single piece of material, and includes a plurality of distinct portions. The support member 14 includes a first, preferably rectangular support or base portion 16 which is generally planar and adapted to fit in aligned relation beneath the first tier of packages $T_1$. The support member further includes a pair of second support, tine-engaging portions 18 which are respectively connected to laterally opposite edges of base portion 16 by a pair of connector portions 20. Connector portions 20 are preferably distinguished from base portion 16 by a pair of fold lines 22 preferably formed during fabrication of the support member 14 by scoring or other means. Second support portions 18 are distinguished from connector portions 20 by a pair of fold lines 24, fold lines 24 preferably being reversely scored to facilitate folding and formation of support member 14 to the configuration illustrated in FIGS. 1 and 2 during formation of shipping load L.

In order to provide support member 14 with a tray-like configuration which facilitates protection of the lower portions of shipping load L, support member 14 further includes a pair of protective first end flap portions 26 respectively connected to longitudinally opposite edges of base portion 16, and distinguished therefrom by fold lines 32. Each first end flap portion 26 includes an end portion 28 and a tuck portion 30 preferably distinguished from each other by a fold line 34. As will be described, each tuck portion 30 of first end flap portions 26 are adapted for insertion between adjacent tiers of shipping load L which facilitate unitization of the shipping load and act to retain support member 14 in its proper position generally beneath the tiers of packages P.

Unitary support member 14 further includes a plurality of protective second end flap portions 36. First and second pairs of end flap portions 36 are provided such that each of the flap portions 36 of each of the pairs is respectively connected to longitudinally opposite edges of a respective one of the second support portions 18. Each second end flap portion 36 includes an end portion 38 and a tuck portion 40, preferably distinguished from each other by a fold line 44, with each second end flap portion 36 preferably distinguished from its respective second support portion 18 by a fold line 42. Like tuck portions 30 of first end flap portions 26, tuck portions 40 are adapted for insertion between adjacent tiers of shipping load L during formation of the load, in this way enhancing the unitized nature of the shipping load and affording protection for longitudinally opposite sides of second tier $T_2$ which the second end flap portions are adapted to overlap and fit against.

Formation of shipping load L is greatly facilitated by use of unitary support member 14. In a presently preferred form, support member 14 is first placed in position on suitable rollers or a like conveying surface while the support member is substantially flat and unfolded. First tier $T_1$ of at least one package P is then placed upon base portion 16 of support member 14, and first end flap portions 26 are folded upwardly to overlap and fit against longitudinally opposite sides of first tier $T_1$. The support member 14 is further folded so that connector portions 20 extend vertically from base portion 16 and overlap and fit against laterally opposite sides of first tier $T_1$, and so that second support portions 18 extend generally outwardly of base portion 16, connector portions 20, and first tier $T_1$.

Packages P of second tier $T_2$ are then placed atop the packages of first tier $T_1$ so that portions of second tier $T_2$ overhang laterally opposite sides of the first tier, with second support portions 18 of support member 14 adapted to fit beneath and underlie the overhanging portions. At this point in formation of shipping load L, tuck portions 30 of the first end flap portions 26 are preferably folded over second tier $T_2$ so that the tuck portions 30 extend inwardly of the load to be formed. It will be appreciated that first end flap portions 26 may be variously dimensioned to provide for tucking in of a portion of the end flap portions 26, with the arrangement shown being one preferred configuration.

The next third tier of packages $T_3$ is then positioned atop the second tier $T_2$ so that tuck portions 30 of end flap portions 26 are firmly retained between adjacent tiers $T_2$ and $T_3$ of the load L to be formed. Second end flap portions 36 are then folded such that each tuck portion 40 preferably overlaps third tier $T_3$ before the packages P of the fourth tier $T_4$ are positioned atop the third tier $T_3$. Thus, each tuck portion 40 extends inwardly of the load L to be formed, and is firmly retained between adjacent tiers of the load after fourth tier $T_4$ is placed atop third tier $T_3$. As previously noted regarding first end flap portions 26, second end flap portions 36 may be variously dimensioned for tucked disposition between adjacent tiers of the load formed other than the third and fourth tiers $T_3$ and $T_4$.

While the above sequence is preferably performed by suitable automatic machinery, it will be appreciated that a variety of alternative methods could be employed, with variations in the tier placement steps and folding sequence effected with formation of the desired unitized load still resulting. For example, support member 14 may be prefolded so its tray-like configuration is partially formed before placement of packages thereon. Other changes could be similarly effected, with the method described intended as presently preferred and illustrative.

Significantly, formation of the load L as described above provides a shipping load which is "self-unitized", with portions of the load itself cooperating with support member 14 to provide the desired integral, unitized load structure. Formation of load L is completed by placement of additional tiers of packages P successively upon the lower tiers of the load until a shipping load of the desired size is formed. The entire load L may then be readily transported by use of forklift 10, with the lower surfaces of second support portions 18 of support member 14 adapted for tine-engagement by lift tines 12, and support member 14 protecting the lower portions of load L from damage by the lift tines. After transport of shipping load L, packages P of the load may be removed, with the inexpensive nature of support member 14 facilitating its economical disposal and obviating problems of pallet storage and return typically associated with use of wooden shipping pallets.

With reference now to FIGS. 4–6, shipping load $L_1$ is illustrated in accordance with a further embodiment of the present invention. Load $L_1$ includes multiple tiers of packages P in a layered array (shown partially cutaway in FIG. 5 for clarity), and is provided with a unitizing support member 14 as described above. The unitizing arrangement illustrated in these figures differs from the arrangement embodied in previously described shipping load L in that a protective top cover member is provided for protection of upper portions of the shipping load, and shipping straps encircle the load for further enhancing its unitized nature.

Top cover member 50, illustrated in FIG. 6, is preferably formed from a single piece of material and is provided with a pair of longitudinally opposite top end flap portions 52, which are preferably distinguished from the remainder of the top cover member 50 by fold lines 54. Top cover member 50 is preferably fabricated from material which may be economically disposed of after transport and disassembly of shipping load $L_1$, such as 75 point solid fiberboard, or other similar materials. Top cover member 50 may be formed generally flat, with fold lines 54 provided by scoring or other means.

Load $L_1$ illustrated in FIGS. 4 and 5 is assembled with the use of support member 14 in the manner as described above, with tuck portions of support member 14 interleaved between adjacent tiers of packages of the load. After the desired number of tiers of packages for the load $L_1$ have been stacked upon each other, top cover member 50 is placed upon the uppermost tier of the load, and its top end flap portions 52 folded into overlapping relation with and adjacent to opposite longitudinal sides of the uppermost tier of packages.

In this embodiment, the unitized nature of load $L_1$ is enhanced by the provision of shipping straps 56 which longitudinally encircle or encompass the tiers of packages, support member 14, and top cover member 50. Various types of shipping straps may be used in conjunction with this embodiment of the present invention, with Signode 716 Contrax strapping being one type of commercially available shipping strapping which is particularly durable and economical. Shipping straps 56 are suitably tensioned during their application such that they tightly and snugly encircle the tiers of packages, and are arranged such that they underlie and extend the length of second support portions 18 of support member 14 and the overhanging portions of tier $T_1$ of the load to be formed. Significantly, shipping straps 56 do not directly contact packages P of load $L_1$ at the edge portions of the load but instead contact and engage support member 14 and top cover member 50. Thus, even though shipping straps 56 are tensioned to firmly hold the tiers of the load together, deformation or other damage to the packages of the load is minimized which may otherwise result from direct engagement of the shipping straps with packages of the load.

As with other embodiments of the present invention, shipping load $L_1$ depicted in FIGS. 4 and 5 may be packaged in the desired unitized fashion without the use of conventional shipping pallets. Support member 14, top cover member 50, and shipping straps 56 may be economically disposed of upon disassembly of the load after transport to the desired destination.

With reference now to FIGS. 7-9, a unitized shipping load $L_2$ is illustrated formed in accordance with a further embodiment of the present invention. Load $L_2$ includes a unitary support member or tray 60 similar to previously described support member 14, a top cover member 50 as previously described, and a plurality of shipping straps which longitudinally encircle the tiers of packages of the load as well as support member 60 and top cover member 50.

Support member 60 is preferably formed from a single piece of material such as solid fiberboard or the like, and is provided with the desired tray-like unitizing configuration for protection of the lowermost tiers of the load $L_2$ to be formed. Support member 60 includes a first, generally rectangular support or base portion 62, and a pair of second support portions 64 respectively connected to laterally opposite edges of base portion 62 by a pair of connector portions 66. A pair of fold lines 68 preferably distinguish connector portions 66 from base portion 62, while a pair of fold lines 70 preferably distinguish the second support portions 64 from the connector portions 66. Fold lines 70 are preferably formed by scoring or other suitable means to provide a reverse fold so that base portion 62 fits beneath the lowermost tier $T_1$ of load $L_2$, and second support portions 64 may be readily positioned beneath in underlying relation to portions of the second tier $T_2$ which overhang the first tier $T_1$. As with previously described embodiments, this configuration for shipping load $L_2$ provides a pair of laterally spaced openings for receiving lift tines from a forklift or the like, with second support portions 64 presenting their lower surfaces for engagement with the lift tines. Connector portions 66 flank and are adjacent to laterally opposite sides of first tier $T_1$, thereby protecting this tier from possible damage by the lift tines during handling of the load.

Support member 60 further includes a pair of first end flap portions 72 respectively connected to longitudinally opposite edges of base portion 62, and preferably distinguished therefrom by a pair of fold lines 74. As illustrated, first end flap portions 72 are adapted to be folded upwardly from base portion 62 so that the first end flap portions overlap and are adjacent to longitudinally opposite sides of the first tier of packages $T_1$ of the load to be formed. In this way, the surfaces of the lowermost tier $T_1$ are substantially entirely protected by the support member 60. Naturally, first end flap portions 72 may be dimensioned to overlap the sides of tiers of the load above first tier $T_1$.

In order to further protect the lowermost tiers of the packages in the shipping load $L_2$, support member 60 further includes a plurality of second end flap end portions 76. First and second pairs of second end flap portions 76 are provided, with the end flap portions 76 of each pair respectively connected to longitudinally opposite edges of a respective one of the second support portions 64. As illustrated in FIG. 9, each second end flap portion 76 is preferably distinguished from its respective second support portion 64 by a fold line 78.

Second end flap portions 76 are adapted to overlap and fit adjacent to longitudinally opposite sides of second tier $T_2$ of load $L_2$ to be formed. In this way, protection of these areas of the load is provided by support member 60, and the unitized nature of the load enhanced. As with first end flap portions 72, the dimensions of the second end flap portions 76 may be varied if it is desired that the end flap portions overlap the longitudinally opposite sides of the lowermost tiers of the shipping load above second tier $T_2$ in order to enhance protection of these portions of the load during transport and handling.

The unitized shipping load $L_2$ further includes a top cover member 50 as previously described. Top cover member 50 includes top end flap portions 52 which overlap longitudinally opposite sides of the uppermost portions of the shipping load, and particularly the uppermost tier of packages P. As noted, top cover member 50 is preferably fabricated from a single piece of material which may be economically disposed of when the shipping load is disassembled.

In order to further enhance the unitized nature of shipping load $L_2$, a plurality of shipping straps are provided which longitudinally encircle or encompass the tiers of packages, the support member 60, and cover member 50. In this embodiment, a pair of first shipping straps 80 are arranged such that they underlie and extend the length of second support portions 64 of support member 60. First shipping straps 80 are tensioned to fit tightly about the tiers of the load, with the arrangement of support member 60 and top cover member 50 protecting the portions of the packages of the load which they cover from deformation from the tightly fitted shipping straps.

In this embodiment, a further pair of second shipping straps 82 are provided which longitudinally encircle the tiers of packages of the load. Second straps 82 are disposed generally between first straps 80, and are arranged such that they extend beneath and underlie base portion 62 of support member 60 beneath first tier $T_1$ of the load. Since second straps 82 encompass support member 60 and top cover member 50, there is not direct engagement of the straps 82 with corner portions of the load, and thus the preferably tightly tensioned straps 82 do not cause deformation or other damage to the portions of the load about which they extend.

Formation of shipping load $L_2$ is generally as described above. Support member 60 is placed in position while substantially flat and unfolded, or may be prefolded so that connector portions 66 and first end flap portions 72 extend generally upwardly of first support portion 62. The first tier of packages $T_1$ is then positioned atop base portion 62, first end flap portions being adapted to fit against and overlap longitudinally opposite sides of the first tier. The second tier of packages $T_2$ is next positioned atop the first tier so that portions of the second tier overhang the first tier as illustrated, with second support portions 64 arranged to underlie the overhanging portions. Successive tiers of packages may then be arranged in the desired array to form the load L₂, with top cover member 50 put in place upon the uppermost tier of the load. Second end flap portions 76 are folded so that they overlap the second tier of the load, and top end flap portions 52 of cover member 50 are folded downwardly so that they overlap the uppermost tier of the load. First and second shipping straps 80 and 82 may then be fitted about the tiers of packages, the support member and cover member, and formation of unitized shipping load L₂ is complete. The overhanging portions of the second tier T₂ define laterally spaced, tine-receiving openings so that the lift tines of a forklift or the like may be fitted beneath and brought into engagement with the lower surfaces of second support portions 64 of support member 60.

Thus, the present invention provides a packaging arrangement and method which greatly facilitates formation of easily handled unitized shipping loads which are suited for handling and transport by vehicle-mounted lift tines. The components of the packaging arrangement may be inexpensively fabricated so that they may be disposed of after use, yet provide the desired protection of the contents of the load so that damage to the load during handling is minimized.

From the foregoing, it will be understood that various modifications and substitutions can be made by those skilled in the art without departing from the novel spirit and scope of the present invention.

What is claimed is:

1. An arrangement adapted for unitizing a shipping load which is adapted for transport upon vehicle-mounted lift tines, the load comprising multiple tiers of packages in a layered array wherein the second tier includes portions overhanging laterally opposite sides of the first tier, the arrangement comprising:
    a unitary support member adapted to fit beneath and support said load,
    said support member including a first support portion adapted to fit beneath said first tier of packages, and a pair of second support portions respectively connected to laterally opposite edges of said first support portion by a pair of connector portions, said second support portions being adapted to respectively fit beneath said overhanging portions of said second tier and be engaged by said lift tines during transport of said load, and
    said support member further including a pair of first end flap portions respectively connected to longitudinally opposite edges of said first support portion and each adapted to overlap longitudinally opposite sides of said first tier, and first and second pairs of second end flap portions, the second end flap portions of each of said first and second pairs being respectively connected to longitudinally opposite edges of a respective one of said second support portions, each of said second end flap portions being adapted to overlap a respective one of the outwardly facing sides of said overhanging portions of said second tier of packages to protect said overhanging portions of said second tier.

2. The arrangement for unitizing in accordance with claim 1, wherein
    each of said first end flap portions includes a portion adapted to fit between adjacent ones of said tiers.

3. The arrangement for unitizing in accordance with claims 1 or 2, wherein
    each of said second end flap portions includes a portion adapted to fit between adjacent ones of said tiers.

4. The arrangement for unitizing in accordance with claim 3, and
    strap means adapted to longitudinally encompass said load, and underlie the overhanging portions of said second tier of packages and said second support portions of said support member.

5. The arrangement for unitizing in accordance with claim 4, and
    a top cover member adapted to overlie the uppermost tier of packages of said array and including a pair of top flap portions adapted to respectively overlap longitudinally opposite sides of said uppermost tier of packages,
    said strap means encompassing said top cover member.

6. The arrangement for unitizing in accordance with claim 1, and
    first strap means adapted to longitudinally encompass said load, and underlie the overhanging portions of said second tier of packages and said second support portions of said support member, and
    second strap means adapted to encompass said load and underlie said first support portion of said support member.

7. The arrangement for unitizing in accordance with claim 5, and
    a top cover member adapted to overlie the uppermost tier of packages of said array and including a pair of top flap portions adapted to respectively overlap longitudinally opposite sides of said uppermost tier of packages,
    said first and second strap means encompassing said top cover member.

8. A packaging arrangement adapted for unitizing a shipping load which comprises multiple tiers of packages in an array wherein the second tier includes portions overhanging laterally opposite sides of the first tier so that the load is adapted for transport upon vehicle-mounted lift tines, the packaging arrangement comprising:
    a unitary support tray adapted to fit beneath said load, said support tray including a base portion adapted to fit beneath said first tier, a pair of connector portions respectively connected to laterally opposite edges of said base portion and adapted to extend vertically thereof adjacent laterally opposite sides of said first tier, and a pair of tine-engaging portions respectively connected to said connector portions and adapted to underlie said overhanging portions of the second tier of packages,
    said support tray further including a pair of first end flap portions respectively connected to longitudinally opposite edges of said base portion and adapted to respectively overlap longitudinally opposite sides of said first and second tiers, each first end flap portion including a portion extending inwardly of said load between the second tier of packages and a third tier atop the second tier, and
    said support tray further including first and second pairs of second end flap portions, the second end flap portions of each pair of second end flap portions being respectively connected to longitudinally opposite edges of a respective one of said tine-engaging portions, each of said second end flap portions being adapted to overlap the sides of the second and third tier of packages and each including a portion extending inwardly of said load between the third tier of packages and a fourth tier positioned atop the third tier.

9. The packaging arrangement in accordance with claim 8, and
strap means adapted to tightly encircle said load and said support tray, and adapted to underlie said overhanging portions of said second tier and said tine-engaging portions along the length of said tine-engaging portions.

10. The packaging arrangement in accordance with claim 9, and
a top cover member adapted to fit atop the uppermost tier of said load and be encircled by said strap means, said cover member including a pair of depending end flap portions adapted to overlap longitudinally opposite sides of said uppermost tier of said load.

11. A method of forming a unitized shipping load adapted for transport by vehicle-mounted lift tines and including multiple tiers of packages in a layered array, the method comprising the steps of:
providing a unitary support tray including a base portion, a pair of tine-engaging portions respectively connected to laterally opposite sides of said base portion by a pair of connector portions, a pair of first end flap portions connected to longitudinally opposite edges of said base portion, and a plurality of second end flap portions each respectively connected to the longitudinally opposite edges of said tine-engaging portions;
placing a first tier of at least one package on said base portion between said connector portions and said first end flap portions;
folding said support tray so that said connector portions extend generally upwardly of said base portion and said tine-engaging portions extend generally laterally away from the connector portions, and so that said first end flap portions extend generally upwardly of said base portion, and respectively overlap the longitudinally opposite sides of the first tier;
placing a second tier of packages on said first tier so that portions of said second tier overhang laterally opposite sides of at least a portion of said first tier, and said tine-engaging portions respectively underlie the overhanging portions of said second tier;
folding each of said second end flap portions into overlapping relation with the longitudinal sides of the overhanging portions of said second tier; and
placing at least one more tier of packages atop the second tier so that the unitized shipping load formed thereby may be transported by engagement of the lift tines with the tine-engaging portions of the support tray.

12. The method of forming a unitized load in accordance with claim 11 including the further step of:
folding a portion of each of said first portions inwardly to fit between adjacent tiers of the load, and folding a portion of each of said second flap portions inwardly to fit between adjacent tiers of the load.

13. The method of forming a unitized load in accordance with claim 12, including the further step of:
encircling the tiers of packages with first strap means which underlie and extend the length of said tine-engaging portions of said support tray, and encircling the tiers of packages with second strap means which underlie and extend the length of said base portion of said support tray.

14. The method of forming a unitized load in accordance with claim 13, including the further step of:
placing a top cover member including a pair of depending top end flap portions upon the uppermost tier of the load to be formed before encircling the tiers with said first and second strap means so that the top cover member is encircled by the first and second strap means and said top end flap portions respectively overlap longitudinally opposite sides of the uppermost tier.

15. The method of forming a unitized load in accordance with claim 12, including the further steps of:
placing a top cover member including a pair of depending top end flap portions upon the uppermost tier of the load to be formed, and
encircling the tiers with strap means which underlie and extend the length of said tine-engaging portions of said support tray so that the top cover member is encircled by the strap means and the top end flap portions respectively overlap longitudinally opposite sides of the uppermost tier.

16. A unitized shipping load adapted for handling and transport by a pair of vehicle-mounted lift tines, comprising:
a plurality of tiers of packages arranged in a layered array wherein the second tier includes portions which overhang laterally opposite sides of at least a portion of the lowermost first tier of the array to define a pair of laterally spaced tine-receiving openings; and
a unitary support member including a base portion fitted beneath said first tier, and a pair of tine-engaging portions respectively connected to laterally opposite edges of said base portion by a pair of connector portions, said tine-engaging portions fitting beneath and underlying the overhanging portions of said second tier;
said support member further including first end flap portions connected to longitudinally opposite edges of said base portion and extending upwardly therefrom adjacent longitudinally opposite sides of said first tier, and first and second pairs of second end flap portions, the second end flap portions of each pair of second end flap portions being respectively connected to longitudinally opposite edges of a respective one of said tine-engaging portions and extending upwardly therefrom adjacent longitudinally opposite sides of the overhanging portions said second tier.

17. The unitized shipping load in accordance with claim 16, wherein
said first end flap portions each include a first tuck portion extending inwardly of the load between adjacent ones of said tiers, and
said second end flap portions each include a second tuck portion extending inwardly of the load between adjacent ones of said tiers.

18. The unitized shipping load in accordance with claim 17, and
strap means tightly encompassing said tiers including straps underlying and extending the length of said tine-engaging portions of said support member, and a top cover member fitted atop the uppermost tier of the load and including downwardly depending top end flap portions overlapping longitudinally opposite sides of the uppermost tier of said load, said strap means encompassing said top cover member.

19. The unitized shipping load in accordance with claim 16, and first strap means tightly encompassing said tiers and underlying and extending the length of said tine-engaging portions of said support member;

second strap means tightly encompassing said tiers and underlying and extending the length of said base portion of said support member, and a top cover member fitted atop the uppermost tier of the load and including downwardly depending top end flap portions overlapping longitudinally opposite sides of the uppermost tier of said load, said first and second strap means encompassing said top cover member.

* * * * *

UNITED STATES PATENT AND TRADEMARK OFFICE
CERTIFICATE OF CORRECTION

PATENT NO. : 4,429,794

DATED : February 7, 1984

INVENTOR(S) : Jay D. Steger et al

It is certified that error appears in the above-identified patent and that said Letters Patent is hereby corrected as shown below:

On the Title Sheet, left-hand column Insert:

-- Assignee: Reichel & Drews, Inc.
Itasca, Illinois
(an Illinois Corporation) --

Signed and Sealed this

Twenty-third Day of October 1984

[SEAL]

Attest:

GERALD J. MOSSINGHOFF

*Attesting Officer*     *Commissioner of Patents and Trademarks*